US007913228B2

(12) United States Patent
Ericsson et al.

(10) Patent No.: US 7,913,228 B2
(45) Date of Patent: Mar. 22, 2011

(54) TRANSLATION VIEWER FOR PROJECT DOCUMENTATION AND EDITING (75) Inventors: Matthew R. Ericsson, Lyndhurst, OH (US); David R. Curry, Lyndhurst, OH (US); Christopher E. Stanek, Willoughby, OH (US); Fabio Malaspina, Twinsburg, OH (US); Ronald E. Bliss, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1138 days.

(21) Appl. No.: 11/537,110

(22) Filed: Sep. 29, 2006

(65) Prior Publication Data
US 2008/0098356 A1  Apr. 24, 2008

(51) Int. Cl.
G06F 9/44 (2006.01)
G06F 17/28 (2006.01)
G06F 17/20 (2006.01)

(52) U.S. Cl. ........... 717/123; 704/2; 704/7; 704/8

(58) Field of Classification Search .......... 717/106, 717/123; 704/2, 8, 7; 707/999; 715/265
See application file for complete search history.

(56) References Cited

U.S. PATENT DOCUMENTS

| 4,510,565 A | 4/1985 | Dummermuth | |
| 4,553,205 A | 11/1985 | Porchia | |
| 4,616,333 A | 10/1986 | Shimoni | |
| 4,718,025 A | 1/1988 | Minor et al. | |
| 4,731,735 A * | 3/1988 | Borgendale et al. | 1/1 |
| 4,773,028 A | 9/1988 | Tallman | |
| 4,831,529 A * | 5/1989 | Miike et al. | 704/4 |
| 4,975,865 A | 12/1990 | Carette et al. | |
| 5,003,469 A | 3/1991 | Kamiyama et al. | |
| 5,051,932 A | 9/1991 | Inove et al. | |
| 5,274,781 A | 12/1993 | Gibart | |
| 5,452,201 A | 9/1995 | Pieronek et al. | |
| 5,568,383 A * | 10/1996 | Johnson et al. | 704/2 |
| 5,805,442 A | 9/1998 | Crater et al. | |

(Continued)

FOREIGN PATENT DOCUMENTS
EP  0490864  6/1992
(Continued)

OTHER PUBLICATIONS

"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.

(Continued)

Primary Examiner — Wei Y Zhen
Assistant Examiner — Chih-Ching Chow
(74) Attorney, Agent, or Firm — Turocy & Watson LLP; R. Scott Speroff; John M. Miller (57) ABSTRACT A software documentation system is provided. This includes a selection component that detects a project component within a context of a current language. A translation viewer displays alternative language documentation associated with the detected project component, where the translation viewer can be associated with an editor that is linked to the context of the current language. Other aspects include providing components to switch from a current language to an alternative language within the software documentation or development system.

34 Claims, 10 Drawing Sheets

U.S. PATENT DOCUMENTS

| | | | |
|---|---|---|---|
| 5,901,323 A | 5/1999 | Milliken et al. | |
| 5,943,675 A | 8/1999 | Keith et al. | |
| 5,991,793 A | 11/1999 | Mukaida et al. | |
| 6,092,036 A * | 7/2000 | Hamann | 704/8 |
| 6,110,214 A | 8/2000 | Klimasauskas | |
| 6,139,201 A * | 10/2000 | Carbonell et al. | 704/2 |
| 6,198,480 B1 | 3/2001 | Cotugno et al. | |
| 6,204,782 B1 | 3/2001 | Gonzalez et al. | |
| 6,219,649 B1 | 4/2001 | Jameson | |
| 6,233,623 B1 | 5/2001 | Jeffords et al. | |
| 6,252,589 B1 | 6/2001 | Rettig et al. | |
| 6,263,487 B1 | 7/2001 | Stripf et al. | |
| 6,298,393 B1 | 10/2001 | Hopsecger | |
| 6,298,454 B1 | 10/2001 | Schleiss et al. | |
| 6,385,496 B1 | 5/2002 | Irwin et al. | |
| 6,411,987 B1 | 6/2002 | Steger et al. | |
| 6,505,247 B1 | 1/2003 | Steger et al. | |
| 6,536,029 B1 | 3/2003 | Boggs et al. | |
| 6,539,271 B2 | 3/2003 | Lech et al. | |
| 6,559,861 B1 | 5/2003 | Kennelly et al. | |
| 6,574,639 B2 | 6/2003 | Carey et al. | |
| 6,584,488 B1 | 6/2003 | Brenner et al. | |
| 6,618,856 B2 | 9/2003 | Coburn et al. | |
| 6,633,782 B1 | 10/2003 | Schleiss et al. | |
| 6,701,324 B1 | 3/2004 | Cochran et al. | |
| 6,754,668 B2 | 6/2004 | Noble et al. | |
| 6,754,885 B1 | 6/2004 | Dardinski et al. | |
| 6,766,214 B1 | 7/2004 | Wang et al. | |
| 6,795,798 B2 | 9/2004 | Eryurek et al. | |
| 6,799,148 B2 | 9/2004 | Ling et al. | |
| 6,847,850 B2 | 1/2005 | Grumelart | |
| 6,847,854 B2 | 1/2005 | Discenzo | |
| 6,865,644 B2 | 3/2005 | Husted et al. | |
| 6,952,727 B1 | 10/2005 | Lindner et al. | |
| 6,975,913 B2 | 12/2005 | Kreidler et al. | |
| 7,043,311 B2 | 5/2006 | Nixon et al. | |
| 7,050,873 B1 | 5/2006 | Discenzo | |
| 7,069,201 B1 | 6/2006 | Lindner et al. | |
| 7,152,222 B2 * | 12/2006 | Kumhyr et al. | 717/107 |
| 7,181,370 B2 | 2/2007 | Furem et al. | |
| 7,206,646 B2 | 4/2007 | Nixon et al. | |
| 7,206,965 B2 | 4/2007 | Roddy et al. | |
| 7,218,974 B2 | 5/2007 | Rumi et al. | |
| 7,228,310 B2 | 6/2007 | O'Brien | |
| 7,249,356 B1 | 7/2007 | Wilson et al. | |
| 7,272,665 B2 | 9/2007 | Yamada et al. | |
| 7,275,062 B2 | 9/2007 | Deitz et al. | |
| 7,286,888 B2 | 10/2007 | Monette et al. | |
| 7,299,367 B2 | 11/2007 | Hamm et al. | |
| 7,328,078 B2 | 2/2008 | Sanford et al. | |
| 7,359,930 B2 | 4/2008 | Jackson et al. | |
| 7,406,453 B2 | 7/2008 | Mundie et al. | |
| 7,574,417 B1 | 8/2009 | McGreevy et al. | |
| 7,584,216 B2 * | 9/2009 | Travieso et al. | 1/1 |
| 7,616,095 B2 | 11/2009 | Jones et al. | |
| 7,627,385 B2 | 12/2009 | McGreevy et al. | |
| 7,684,876 B2 | 3/2010 | Grgic | |
| 7,693,585 B2 | 4/2010 | Kalan et al. | |
| 7,742,833 B1 | 6/2010 | Herbst et al. | |
| 2002/0019839 A1 * | 2/2002 | Shiu | 707/536 |
| 2002/0069235 A1 | 6/2002 | Chen | |
| 2002/0120744 A1 | 8/2002 | Chellis et al. | |
| 2002/0133523 A1 | 9/2002 | Ambler et al. | |
| 2002/0169907 A1 | 11/2002 | Candea et al. | |
| 2002/0174263 A1 | 11/2002 | Codd et al. | |
| 2002/0184601 A1 * | 12/2002 | Fitzhenry et al. | 716/1 |
| 2002/0184610 A1 * | 12/2002 | Chong et al. | 717/109 |
| 2003/0014130 A1 | 1/2003 | Grumelart | |
| 2003/0041135 A1 | 2/2003 | Keyes et al. | |
| 2003/0100958 A1 | 5/2003 | Cachat et al. | |
| 2003/0101208 A1 | 5/2003 | Chauvel et al. | |
| 2003/0130876 A1 | 7/2003 | Ferguson et al. | |
| 2003/0172107 A1 | 9/2003 | Leyfer et al. | |
| 2003/0182303 A1 | 9/2003 | Gibson | |
| 2004/0153437 A1 | 8/2004 | Buchan | |
| 2004/0181294 A1 | 9/2004 | Deitz et al. | |
| 2004/0225649 A1 | 11/2004 | Yeo et al. | |
| 2005/0071755 A1 * | 3/2005 | Harrington et al. | 715/511 |
| 2005/0085928 A1 | 4/2005 | Shani | |
| 2005/0198034 A1 | 9/2005 | Boyer | |
| 2005/0198406 A1 | 9/2005 | Sichner | |
| 2005/0203648 A1 | 9/2005 | Martin | |
| 2005/0210337 A1 | 9/2005 | Chester et al. | |
| 2006/0004827 A1 | 1/2006 | Stuart | |
| 2006/0020928 A1 | 1/2006 | Holloway et al. | |
| 2006/0026559 A1 | 2/2006 | Gunturi et al. | |
| 2006/0067334 A1 | 3/2006 | Ougarov et al. | |
| 2006/0161268 A1 | 7/2006 | Frensch et al. | |
| 2006/0259160 A1 | 11/2006 | Hood et al. | |
| 2006/0291283 A1 | 12/2006 | Jin et al. | |
| 2006/0294502 A1 | 12/2006 | Das et al. | |
| 2007/0006039 A1 * | 1/2007 | Fichter et al. | 714/38 |
| 2007/0027913 A1 | 2/2007 | Jensen et al. | |
| 2007/0028070 A1 | 2/2007 | Avergun et al. | |
| 2007/0038610 A1 | 2/2007 | Omoigui | |
| 2007/0050348 A1 | 3/2007 | Aharoni et al. | |
| 2007/0073744 A1 | 3/2007 | McVeigh et al. | |
| 2007/0112447 A1 | 5/2007 | McGreevy et al. | |
| 2007/0112801 A1 | 5/2007 | McGreevy et al. | |
| 2007/0136533 A1 | 6/2007 | Church et al. | |
| 2007/0142941 A1 | 6/2007 | McGreevy et al. | |
| 2007/0156770 A1 | 7/2007 | Espelien | |
| 2007/0244964 A1 | 10/2007 | Challenger et al. | |
| 2007/0282577 A1 | 12/2007 | Lind | |
| 2007/0288795 A1 | 12/2007 | Leung et al. | |
| 2007/0294078 A1 * | 12/2007 | Kim et al. | 704/2 |
| 2008/0027678 A1 | 1/2008 | Miller | |
| 2008/0082577 A1 | 4/2008 | Hood et al. | |
| 2008/0126408 A1 | 5/2008 | Middleton | |
| 2008/0313228 A1 | 12/2008 | Clark et al. | |

FOREIGN PATENT DOCUMENTS

| | | |
|---|---|---|
| EP | 1109107 | 6/2001 |
| EP | 1307823 | 5/2003 |
| GB | 2347234 | 8/2000 |
| GB | 2353616 A1 | 2/2001 |
| WO | 2004027531 A1 | 4/2004 |
| WO | 2005006130 A | 1/2005 |
| WO | 2005006130 A2 | 1/2005 |
| WO | 2005006130 A3 | 1/2005 |

OTHER PUBLICATIONS

Vermeulen, et al., "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.

Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.

Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.

Uraikul, et al. "Artificial Intelligence for Monitoring and Supervisory Control of Process Systems." Nov. 30, 2006, Engineering Application of Artificial Intelligence, Pineridge Press, Swansea, GB, pp. 115-131, XP005786108, ISSN: 0957-1976.

"Major Canadian Natural Gas Producer Buys AnyWhere/AnyTime Services from Industrial Evolution" Mar. 12, 2001, Industrial Evolution pp. 1.

Real Time Intelligence at the Source-Deploying and EMbedded Historian. Users Conference 2005, pp. 1.

Miller, et al. "Extending the Reach of Enterprise Data Management in a World of M2M." ISA Expo. Oct. 2005, pp. 1-7.

"Proficy Historian"; Dec. 16, 2004, GE Fanuc, pp. 1-8.

Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.

Cardoso, et al. Macro-Based Hardware Compilation of Java (TM) Bytecodes Into a Dynamic Reconfigurable Computing System, Apr.

21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.

Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.

Power RICH System, Enterprise Edition, Historian (PRS EE Historian) Version 1.5, last accessed Dec. 3, 2008, 15 pages.

Wonderware Plant Intelligence Solution Helps Arla Foods Deliver Fresh Milk Products to the Tables of Europe. Last accessed Dec. 3, 2008, 4 pages.

A new general purpose compression method for searching in large collection, Bhadade, U.S.; Sharma, V.K.; Trivedi, A.I.; TENCON 2007—2007 IEEE Region 10 Conference Digital Object Identifier: 10.11 09ITENCON.2007.4428935. Publication Year: 2007, pp. 1-4.

Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.11 09/KAM.2009.151, Publication Year: 2009, pp. 350-353.

Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31, Issue: 4. Digital Object Identifier: 10.11 09/TPAMI.2008.110 Publication Year: 2009, pp. 721-735.

Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET.2009.5353207 Publication Year: 2009, pp. 23-28.

* cited by examiner

TRANSLATION VIEWER FOR PROJECT DOCUMENTATION AND EDITING

TECHNICAL FIELD

The subject invention relates generally to software development systems and more particularly to interface views that are provided of alternative spoken language translations to facilitate translation and documentation in a current spoken language associated with a project.

BACKGROUND

Software Documentation or Source Code Documentation is written text that accompanies computer software and is often created in a computer development environment. Generally, such documentation explains how the underlying code operates and/or how to utilize the code. The term software documentation can have more than one context and thus exist in different forms. Some example types of documentation include architecture or design documentation for software. Another form includes technical documentation of code, algorithms, interfaces, and APIs. Still yet other forms of documentation include manuals for the end-user, system administrators, support staff along with marketing literature including product briefs and promotional information.

Design documents tend to take a broad view. Rather than describe how things are used, this type of documentation focuses more on the why. For example, in a design document, a programmer may explain the rationale behind organizing a data structure in a particular manner, or may list member functions of a particular object and how to add new objects to the code. This may include explaining the reasons why a given class is constructed in a particular manner, outlining patterns, discussing alternative designs, outlining ideas for improvement, or providing plans for how to improve designs later on such as with respect to future projects. This type of documentation is typically not considered appropriate for code or technical documentation however that is designed with other requirements in mind.

Regarding technical documentation, this is the type of information most programmers think of when using the term software documentation. When creating software, code alone is insufficient. There should be some text along with the code to describe various aspects of its intended operation. This documentation is usually embedded within the source code itself so it is readily accessible to anyone who may be traversing though it. In one instance, comments may be added to source code that can be highly technical and are mainly employed to define and explain APIs, data structures and algorithms. For example, one might use this documentation to explain that a variable refers to a particular location or machine in a factory. It is important for code documents to be thorough, but not so verbose that it becomes difficult to maintain. In addition to source code documentation, other technical documentation requirements may include descriptions on tasks, routines, controllers, modules, data types, tags, phases, add-on instructions, and so forth.

Often, tools such as Doxygen, javadoc, ROBODoc, POD or TwinText can be used to auto-generate code documents— that is, they extract comments from the source code and create reference manuals in such forms as text or HTML files. Code documents are often organized into a reference guide style, allowing programmers to quickly look up an arbitrary function or class. Many programmers are comfortable with the notion of auto-generating documentation for various reasons. For example, since it is extracted from the source code itself (for example, through comments), the programmer can write it while referring to their code, and can thus employ the same tools used to create the source code, to generate the documentation.

In addition to standard documentation tasks, systems are now developed for markets across the global economy. Thus, not only is documentation required in the native language employed for code or system development, there often is a requirement to have the documentation translated into one or more foreign languages in addition to the language the original code was developed in. As development of software projects continues to become more global, users have a need to deploy software or system designs across the world where the language of the consumers of the respective design may be different than the language of the creators of the design. Thus, different languages may be spoken by the development engineer, the maintenance engineer, and the operators that view the design which can create problems for those who may need to update, alter, and/or operate the given design.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A translation viewer is provided to facilitate system or project documentation where more than one spoken language may be employed to document components of the system or project. In many cases, software developers design and implement (develop) systems that are to be deployed in more than one country where there are differences in languages such as differences between German, French, and English, for example. Thus, it is highly desirable to be able to add documentation to components in a development project that allows the documentation to be provided in multiple languages so that when the system is finally deployed, users of the system can view the respective documentation or comments in their native languages. In one aspect, a developer assigns comments to a component in a first language such as English, where the first language such as English is set as the current language for entering comments or documentation into a project. Based on previous language translations that may have been developed or entered into the project to support the first language documentation, it is also desirable to harmonize additional comments supplied for the project with previous comments that may have been associated with the project.

The translation viewer provides an automated interface that unobtrusively shows other translations that may exist for a given component while allowing documentation edits to occur in the currently selected language. Thus, in one example, if a developer attempts to comment a current component in the first language and the developer also is fluent in an alternative language the translation viewer provides the alternative language comments in a display while allowing editing in the current language. In this manner, comments being added in the current language can be harmonized or synchronized with previous comments that have been provided in alternative languages. As another feature, the translation viewer alerts designers to the possibility that other language comments may exist and this information can be employed as a queue to the designer that such alternative language comments may need to be adjusted in view of changes that may have occurred in the currently selected documentation language for the project.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided to facilitate software documentation in multiple languages. A user interface for a software development system is provided. This includes a selection component that detects a project component within a context of a current language. A translation viewer displays alternative language documentation associated with the detected project component, where the translation viewer can be associated with an editor that is linked to the context of the current language. Other aspects include providing components to switch from a current language to an alternative language within the software development system. Also, the selection component can be linked to a cursor that automatically triggers activation of the translation viewer.

It is noted that as used in this application, terms such as "component," "viewer," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Furthermore, it is noted that the term translated language and localized language can have similar meanings. Thus, documentation that has been translated from one language to another can be referred to as having been localized.

Figure 1:
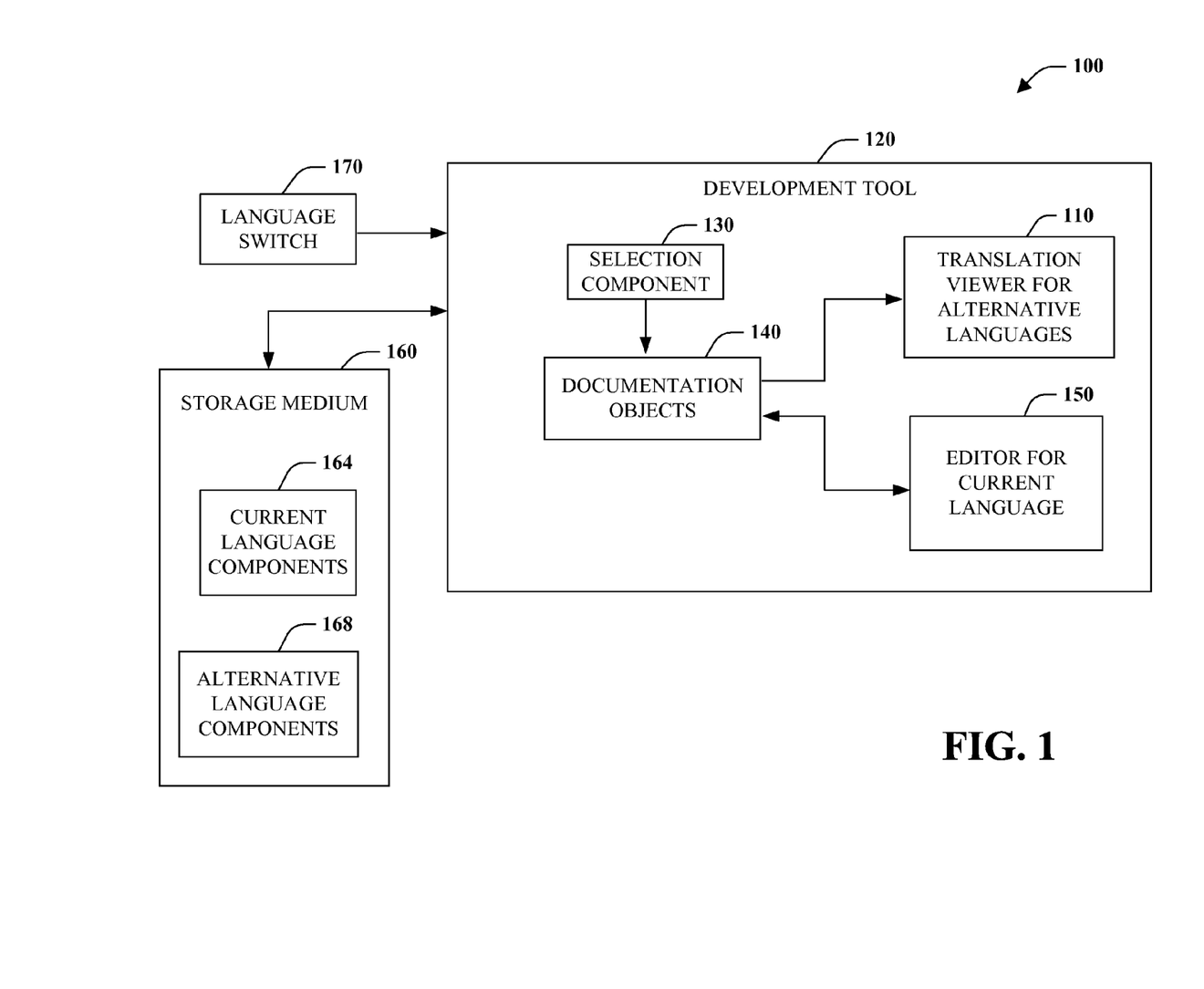
FIG. 1 is a schematic block diagram illustrating a translation viewer for a software development system.

Referring initially to FIG. 1, a software development system 100 provides a translation viewer 110 for software documentation and editing. The translation viewer 110 is associated with a development tool 120 that can provide for substantially any type of software, system, or component development. For example, the development tool 120 can be employed for general computer software development or for applications such as programmable logic controller software as will be described in more detail below. The development tool 120 can also be associated with textual language tools such as a computer or editor to document a given set or subset of components. A selection component 130 such as a cursor or vision sensor identifies one or more documentation objects 140 that can be edited via an editor 150.

As shown, the editor 150 is associated with a current language selected for the development tool 120, whereas the translation component 110 provides a display of alternative languages that may be available for one or more of the documentation objects 140. Such objects 140 can include substantially any type of component that can have documentation such as comments associated therewith. These objects 140 include program objects, program instructions, specifications, design guidelines, algorithms, visual objects, sound objects, ladder logic elements, Sequential Function Chart elements, Function Block Diagrams, or higher level language objects such as associated with C++, Visual Basic, JAVA™, and so forth.

Generally, documentation associated with the objects 140 can be stored in a storage medium 160 (e.g., database, data file), where current language documentation components 164 and alternative language documentation components 168 can be imported and exported to/from the development tool 120. The documentation components 164 and 168 can be in substantially any language (e.g., English, German, French, Russian, and so forth). A language switch 170 can be associated with the development tool 120 to allow switching between a current language documentation context employed by the editor 150 where the current documentation language component 164 is switched to one or more alternative documentation languages supported by the alternative language documentation components 168.

It is noted that there are several methods for generating the alternative language components 168. One method is to send the current language components 164 out to a translation company and have one or more language translations generated from the current language components. Another method would send comments provided at the editor 150 to an automatic translator component (not shown) that would convert current language comments into alternative languages. Such translator components exist in accordance with search engines that are employed on the Internet for example. Still yet another method would allow developers to edit a comment at 150, save the edit, employ the language switch 170 to switch to an alternative language context, enter the comment in the alternative language and again save the comment according to the alternative language context.

The translation viewer 110 is provided to facilitate system or project documentation where more than one spoken language may be employed to document components of the system or project via the editor 150. In many cases, software developers design systems that are to be deployed in more than one country where there are differences in languages such as differences between German, French, and English, for example. Thus, it is desirable to be able to add documentation to components in a development project that allows the documentation to be provided in multiple languages so that when the system is finally deployed, users of the system can view the respective documentation or comments in their native languages. Typically, a developer assigns comments to a component in a first language such as English at 150, where the first language such as English is set as the current language for entering comments or documentation into a project. Based on previous language translations stored at component 168 that may have been developed or entered into the project to support the first language documentation, it is also desirable to harmonize additional comments supplied for the project with previous comments that may have been associated with the project.

The translation viewer 110 provides an automated interface that unobtrusively shows other translations that may exist for a given documentation object 140 while allowing documentation edits at 150 to occur in the currently selected language via the switch 170. Thus, in one example, if a developer attempts to comment a current component in the first language and the developer also is fluent in an alternative language the translation viewer 110 provides the alternative language comments in a display while allowing editing in the current language at 150. In this manner, comments being added in the current language at 150 can be harmonized or synchronized with previous comments displayed at 110 that have been provided in alternative languages at 168. As another feature, the translation viewer 110 alerts designers to the possibility that other language comments may exist and this information can be employed as a queue to the designer that such alternative language comments may need to be adjusted in view of changes that may have occurred in the currently selected documentation language or context for the project.

As noted above, project documentation displayed within the development tool 120 may appear in a current language as configured in an editing environment. If a current language translation does not exist for a particular piece of documentation or documentation object 140, a default language may instead be shown (i.e., another language may be displayed as a fall-back language). When a documentation object 140 is edited at 150 and that documentation is shown as a default language, the text can disappear from the editing control since that particular translation of the documentation is not the actual translation for the language set as the current language or context for the project. Also, project documentation that does have a translation in the current language, when edited at 150, may result in existing (non-current language) translations becoming out-of-sync with the just-edited current language translation without the user knowing that they have potentially affected the validity of the other translations for the documentation objects 140. The translation viewer 110 provides the ability to view a default or alternative translation when editing project documentation at 150. The translation viewer 110 also provides visual hinting that editing a particular piece of project documentation may affect other translations and possibly cause them to be out-of-sync with current language translations.

The translation viewer 110 operates as a dynamically appearing display to aid the user in viewing default or alternative language translations when editing project documentation. Also, the dynamically appearing translations aid the user in understanding that other translations exist beyond the current language translation or context when editing. When a user begins to edit project documentation such as the documentation objects 140 that have been translated, the translation viewer 110 appears dynamically near an active edit control. The viewer 110 can appear faintly and become opaque when a mouse pointer is moved into the area of the viewer. The viewer 110 displays the default or alternative language translation if it was shown in the edit control before the user began the edit. Thus, the translations view provides a "key" to the translation being entered by the user in the active edit control.

Before proceeding, it is noted that the system 100 can include means for editing a documentation object according to a current language context such as provided by the editor 150 and means for viewing (e.g., translation viewer 110) an alternative language documentation object in accordance with the current language context. The system can also include means for switching (language switch 170) between a current language context and an alternative language context.

Figure 2:
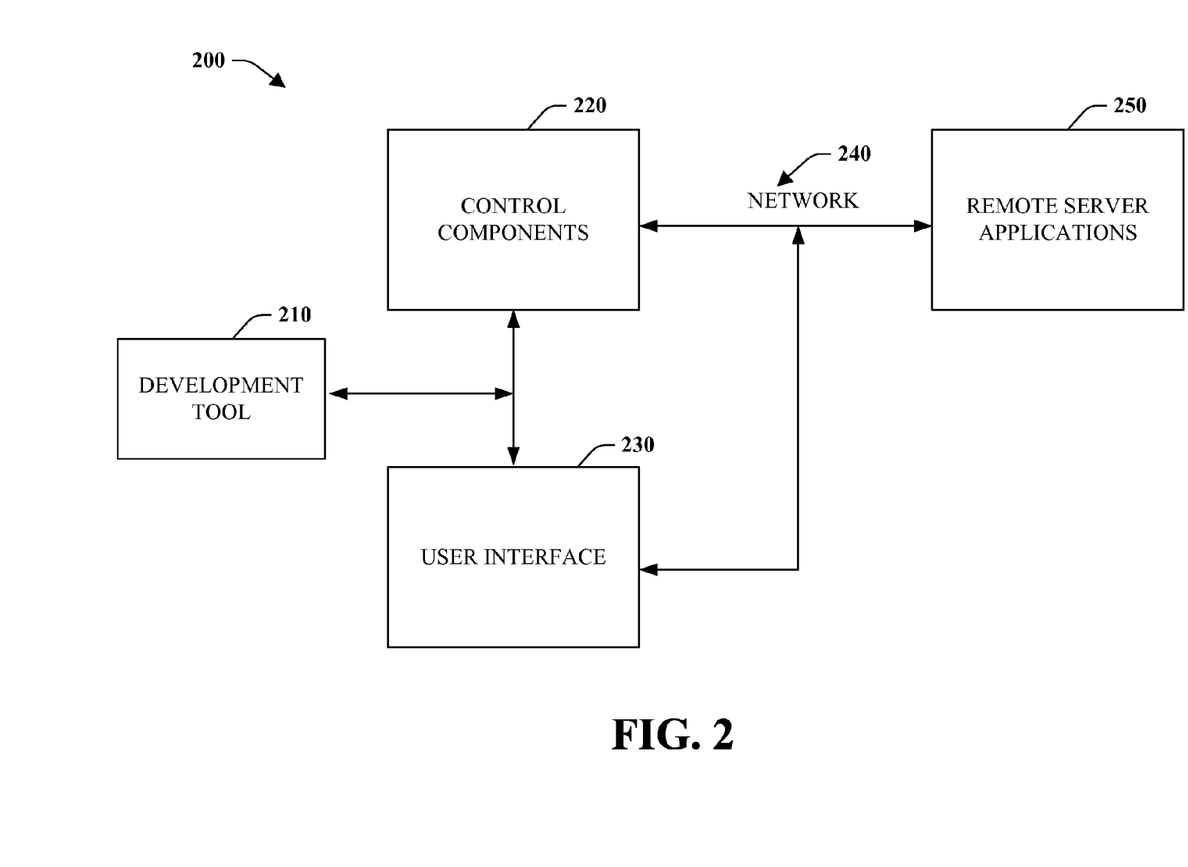
FIG. 2 is a diagram illustrating an example development and documentation system for an industrial control system.

FIG. 2 illustrates an example system 200 that can be employed with the system 100 described above in FIG. 1. In this example, a development and documentation system is shown that can be applied to an industrial control system for example. As shown, the development tool 210 can interact with one or more control components 220 and a user interface 230, where the interface can be employed to supply documentation in accordance with current or alternative language contexts. The control components 220 and interface 230 can communicate across a network 240 with one or more remote server applications.

The control components 220 can include various computer or network components such as servers, clients, programmable logic controllers (PLCs), communications modules, mobile computers, wireless components, control components and so forth which are capable of interacting across the network 240. Similarly, the term PLC as used herein can include functionality that can be shared across multiple components, systems, and/or networks 240. For example, one or more PLCs can communicate and cooperate with various network devices across the network 240. This can include substantially any type of control, communications module, computer, I/O device, sensor, Human Machine Interface (HMI)) such as the user interface 230 that communicate via the network 240 which includes control, automation, and/or public networks. The PLC can also communicate to and control various other devices such as Input/Output modules including Analog, Digital, Programmed/Intelligent I/O modules, other programmable controllers, communications modules, sensors, output devices, and the like, where the development tool 210 and user interface 230 can design/document various aspects for the control components 220.

The network 240 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Turning to FIGS. 3-7, various example interfaces are shown that illustrate various translation viewer concepts. It is to be appreciated however that the respective FIGS. 3-7 are exemplary in nature and can be provided in a plurality of various formats. This can include a Graphical User Interface (GUI) to interact with a development tool or documentation components such as any type of application that sends, retrieves, processes, and/or manipulates data, receives, displays, formats, and/or communicates data, and/or facilitates operation of the development system. For example, such interfaces can also be associated with an engine, server, client, editor tool or web browser although other type applications can be utilized.

The GUI can include a display having one or more display objects for editing or viewing documentation objects including such aspects as configurable icons, buttons, sliders, input boxes, selection options, menus, tabs and so forth having multiple configurable dimensions, shapes, colors, text, data and sounds to facilitate operations with the development tool. In addition, the GUI can also include a plurality of other inputs or controls for adjusting and configuring one or more aspects. This can include receiving user commands from a mouse, keyboard, speech input, web site, remote web service or other device such as a camera or video input to affect or modify operations of the GUI.

Figure 3:
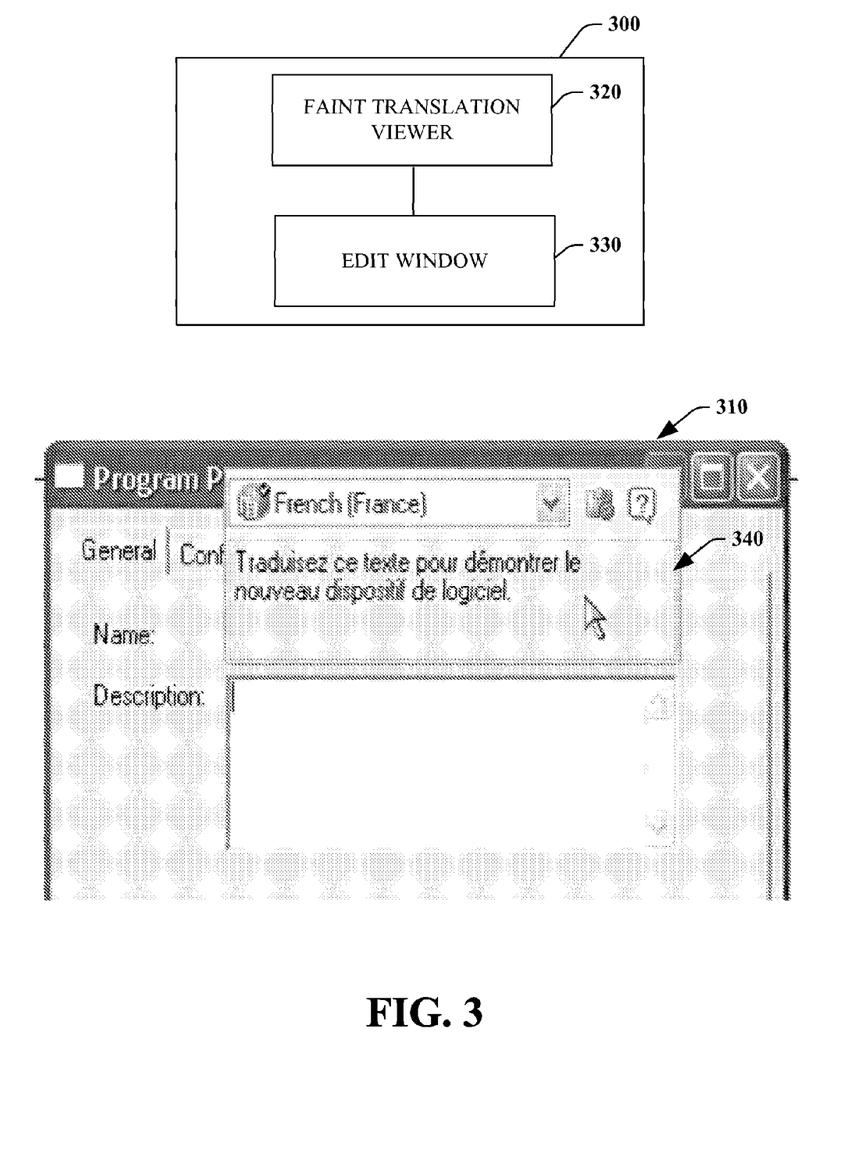
FIG. 3 is a diagram illustrating example translation viewer interfaces.

Referring to FIG. 3, example translation viewer interfaces 300 and 310 are illustrated. As noted above, translation viewers can be provided to the user when an edit of documentation that includes translations begins. The viewer is useful for editing of default/alternative translations. If no translations are configured for a piece of documentation, the translation viewer is not invoked and therefore does no appear for that documentation.

The translation viewer 300 and 310 shows the current language description if one exists. If a current language description does not exist, then the translation viewer is populated with a default or alternative language description. If neither a current nor default language description exists, then the viewer's contents default to the first language in the viewer's combo box (described below) that actually provides a translation. By displaying the translation viewer when translations exist for a piece of documentation, the user is given a hint that changing documentation affects not only the documentation that is being changed, but also the continued validity of the translations that exist for the documentation that is being changed.

When an edit control containing a default translation becomes active, the default translation is cleared. However, a faint translation viewer such as shown at 320 appears above an editing window 330. Without forcing the user to give attention to the translation viewer 320, it can be shown alpha blended when first created, for example. If the user does not desire to use the viewer 320, it may more easily be ignored in its faint form at 320. However, if the user does desire to use the viewer to enter a translation, a simple mouse-over causes the viewer to be opaque as illustrated at 340 of interface 310. After the viewer 320 is moused-over, it can remain opaque at 340 until the edit control ceases activation. The viewer 340 provides a translation key in the form of the selected default language automatically for the user and can be set so that it is not be manually repositioned or resized. The translation viewer 340 may be shut off via a workstation option if the user does not desire to employ such functionality.

Figure 4:
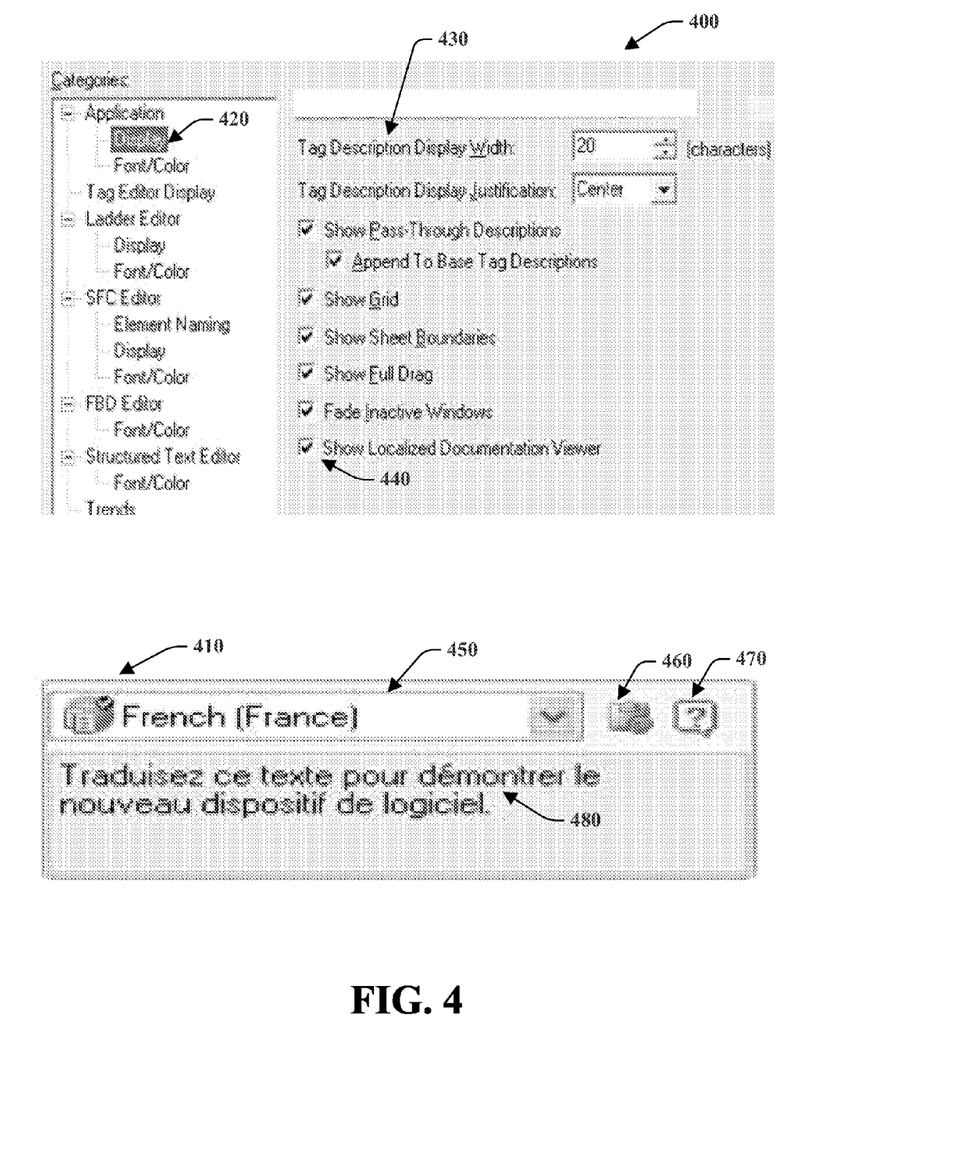
FIG. 4 is a diagram illustrating an example configuration menu and example translation viewer pane.

Proceeding now to FIG. 4, an example configuration menu 400 and translation viewer pane 410 is illustrated. At 420, display configurations are selected which provides a configuration view for the display at 430. Configurations at 430 can include setting display widths, display justifications, showing pass-thru descriptions, appending to base tag descriptions, display grid options, sheet boundary options, drag options, inactive window options (e.g., fade), and showing a localized documentation viewer at 440. If this option 440 is unchecked, translation viewer capabilities are disabled. As shown below selected display 420, configuration options can be provided for fonts or colors, tag editor displays, ladder editors, SFC editors, and other editors such as structured text editors. Thus, translation viewers can be configured, enabled or disabled for a particular editor if desired.

Proceeding to the translation viewer pane 410 various functionality is described. At 450, a language combination box is provided that allows users to select default or alternative languages for the translation viewer to display. In this example, French is selected as the alternative language. The behavior of this combo box 450 is similar to the behavior described for the "Default" combo box on the Configuration Dialog. One difference is that generally only languages that have translations for the current piece of documentation are included in the list of languages from which to choose. Thus the user is able to view all translations for a piece of documentation directly within the respective software environment. At 460, a paste translation button is provided to the right of the combo box 450 and provides similar behavior as a "Paste Pass-Through" operation. When this button 460 is pressed, the text in the viewer is placed into the edit control below the button. Typically, any text in the edit control is replaced with the pasted text as a result of this operation.

At 470, a help button is provided which brings up help options for the viewer when selected. At 480, an example translation text is shown. The bottom portion of the dialog is reserved for display of translation text in the language chosen in the combo box 450. The text is displayed with tabs and carriage returns that exist in the string. Description width formatting in a workstation options menu (not shown) generally has no affect on this particular control, where the text can be wrapped to fill the entire window. If the translation text does not completely fit, a vertical scrollbar can be provided. Text in this control at 480 may be selected and copied, but not edited since the current language is selected for editing. The height of this control is typically large enough to fit at least 4 lines of western-style text.

Figure 5:
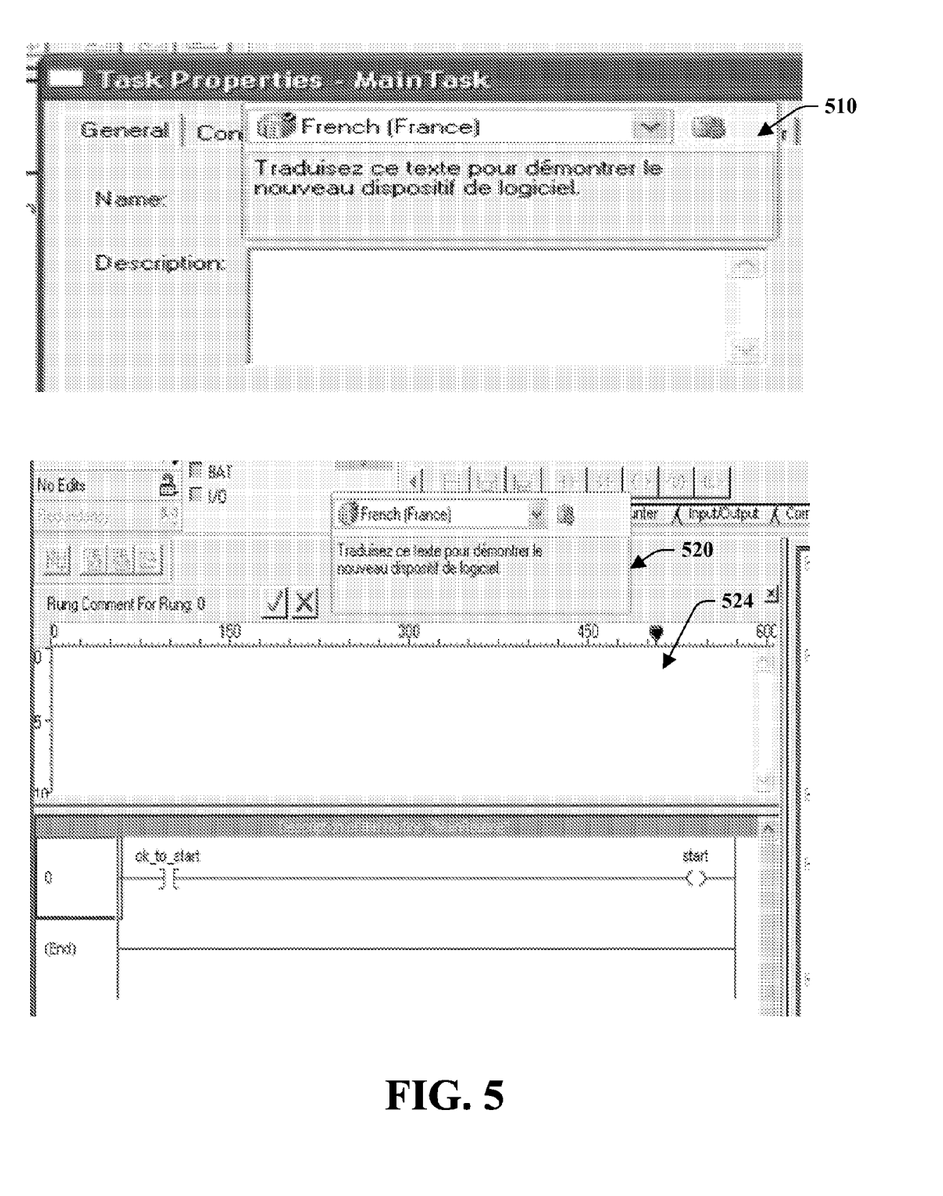
FIGS. 5-7 illustrate example translation viewers for different development tool contexts.

Referring to FIGS. 5-7, example translation viewers are shown for different development tool contexts. At 510 of FIG. 5, a translation viewer appears as part of a property dialog when edits are performed on various properties. Such property dialogs include Controller properties, Task properties, Program properties, Routine properties, Tag properties, Description properties, Module properties, Add-On properties, Alarm Message properties and so forth. At 520, a translation viewer is shown in the context of a ladder editor. This viewer 520 may appear above a text editing area 524 at the top of the editor window. In this context, edits can occur as part of a Documentation Editor, for Rung Comments, for Operand Descriptions and so forth.

Figure 6:
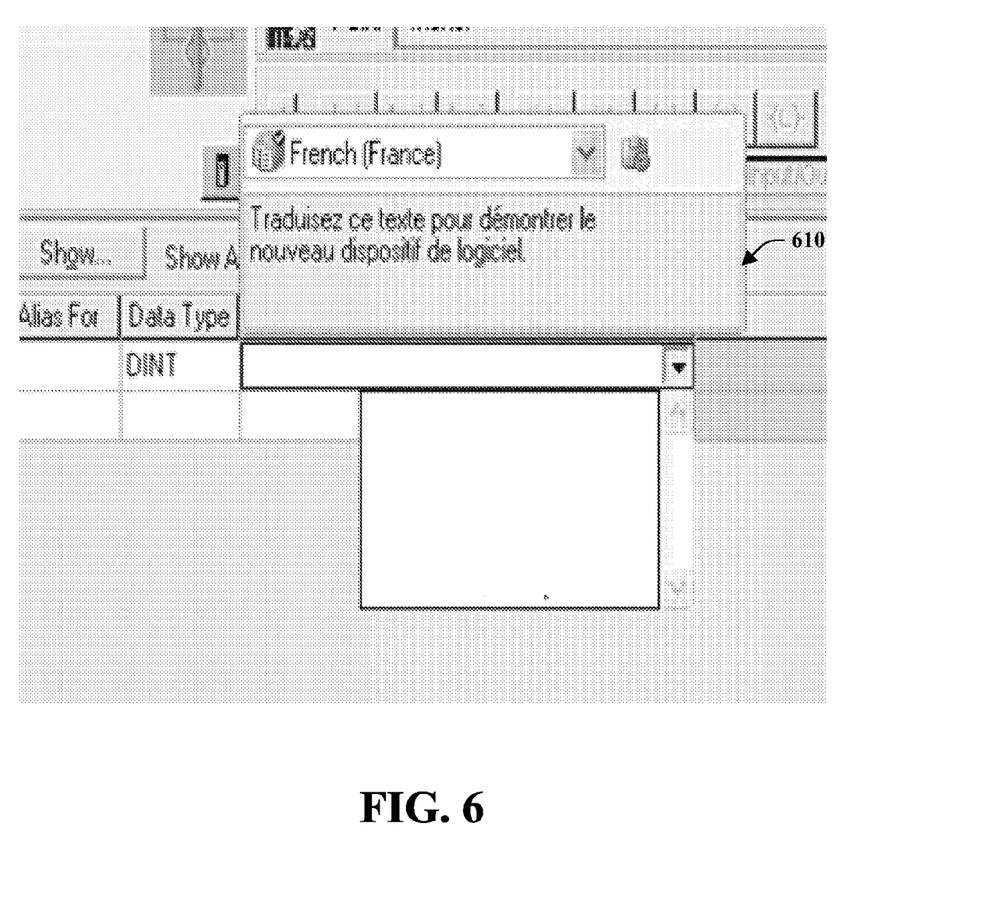
Figure 7:
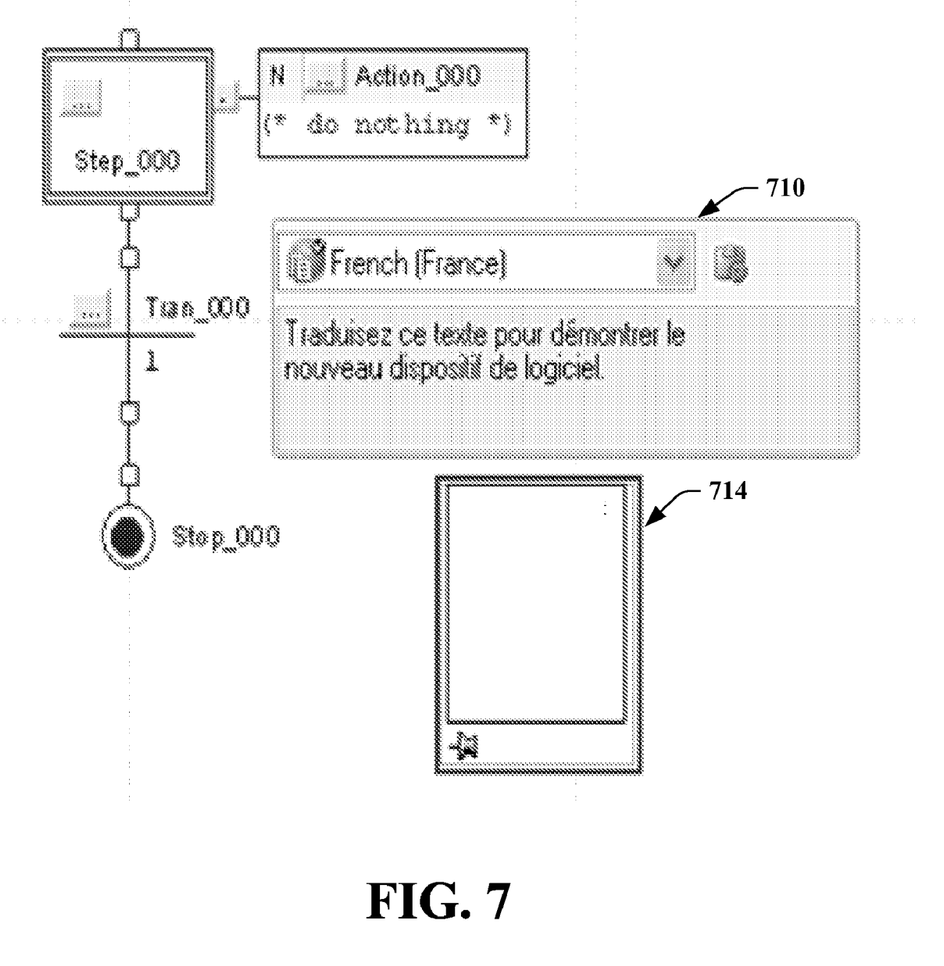

Referring to 610 of FIG. 6, a translation viewer for a tag editor is shown. This editor may appear above and left justified with the cell that normally contains the description in the grid, for example. This translation viewer 610 is generally associated with objective grid controls including tags and UDT members, for example. Referring briefly to FIG. 7, a translation viewer 710 for a Sequential Function Chart editor is shown. This viewer 710 may appear above a text or description box such as at 714. Context for when the viewer 710 can appear includes Documentation Editors, Text Boxes, Description Boxes in SFC, and Element Descriptions, for example.

Figure 8:
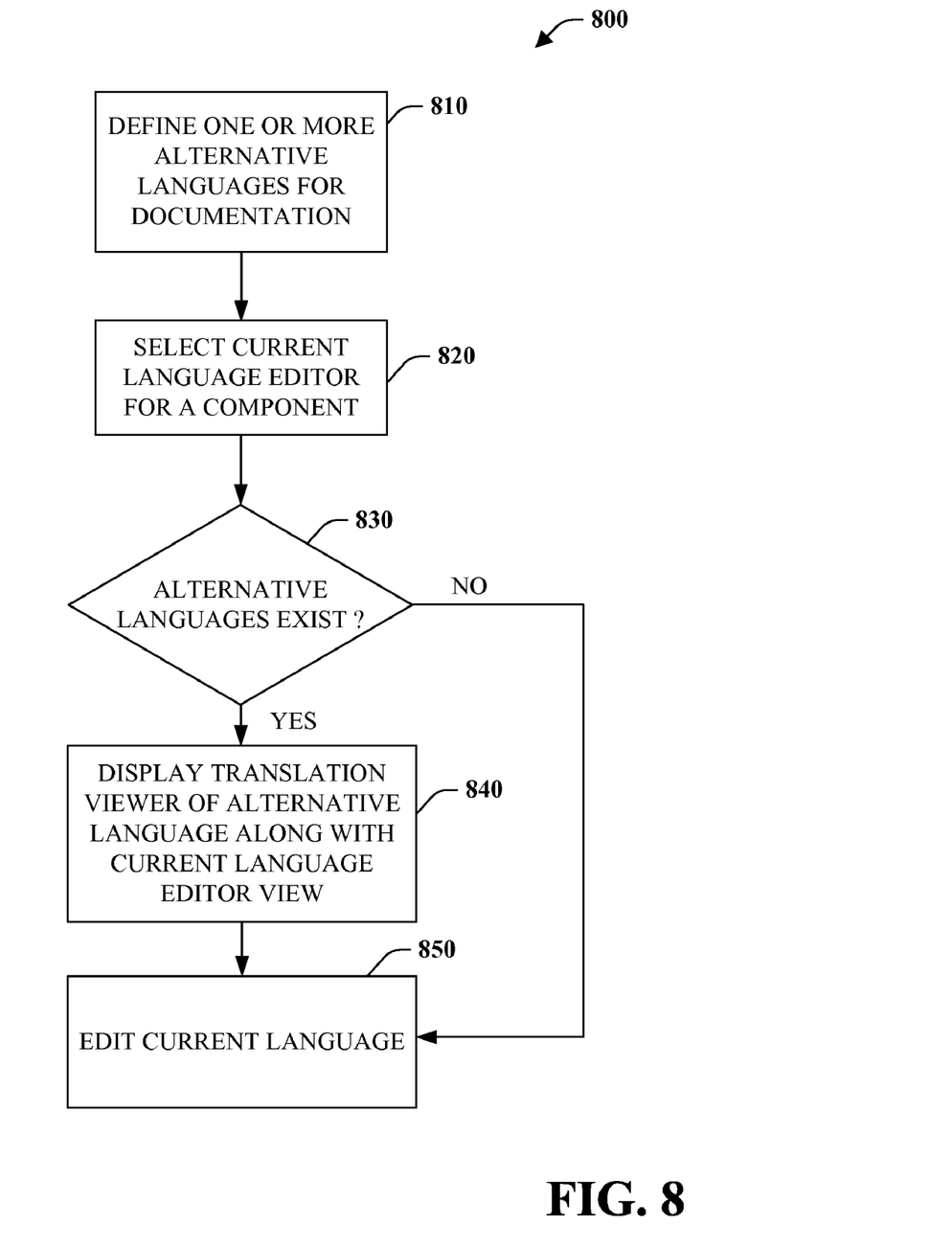
FIG. 8 is a flow diagram illustrating a editing and documentation process.

FIG. 8 illustrates a software documentation process 800. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 810 of FIG. 8, one or more alternative languages are defined to document a given software object. This can include substantially any known language or codes that substitute for language. As noted above, comments in one language can be exported for example, and translated into comments for several other languages before being imported back into the system. Auto translation is also possible for alternative language components that are automatically generated form the selected current language. At 820, a current language editor is selected for a given documentation object including tags, programs, rungs, instructions, general documentation and so forth. In one example, English may be selected as the current language where future invocations of any editing function should employ English as the current language. In other development situations or environments, other languages may be selected as the current language editor.

At 830, after a language editor has been selected for a component at 820, a decision is made as to whether or not an alternative language component exists for a selected documentation object. If an alternative language does exist at 830, the process 800 proceeds to 840 where a translation viewer of the alternative language is displayed along with a current language view associated with the editor. At 850, the current language documentation is edited, where the translation view is provided at 840. If no alternative language documentation exists at 830, the translation viewer is not invoked at 840, where editing in the current language then proceeds at 850.

Figure 9:
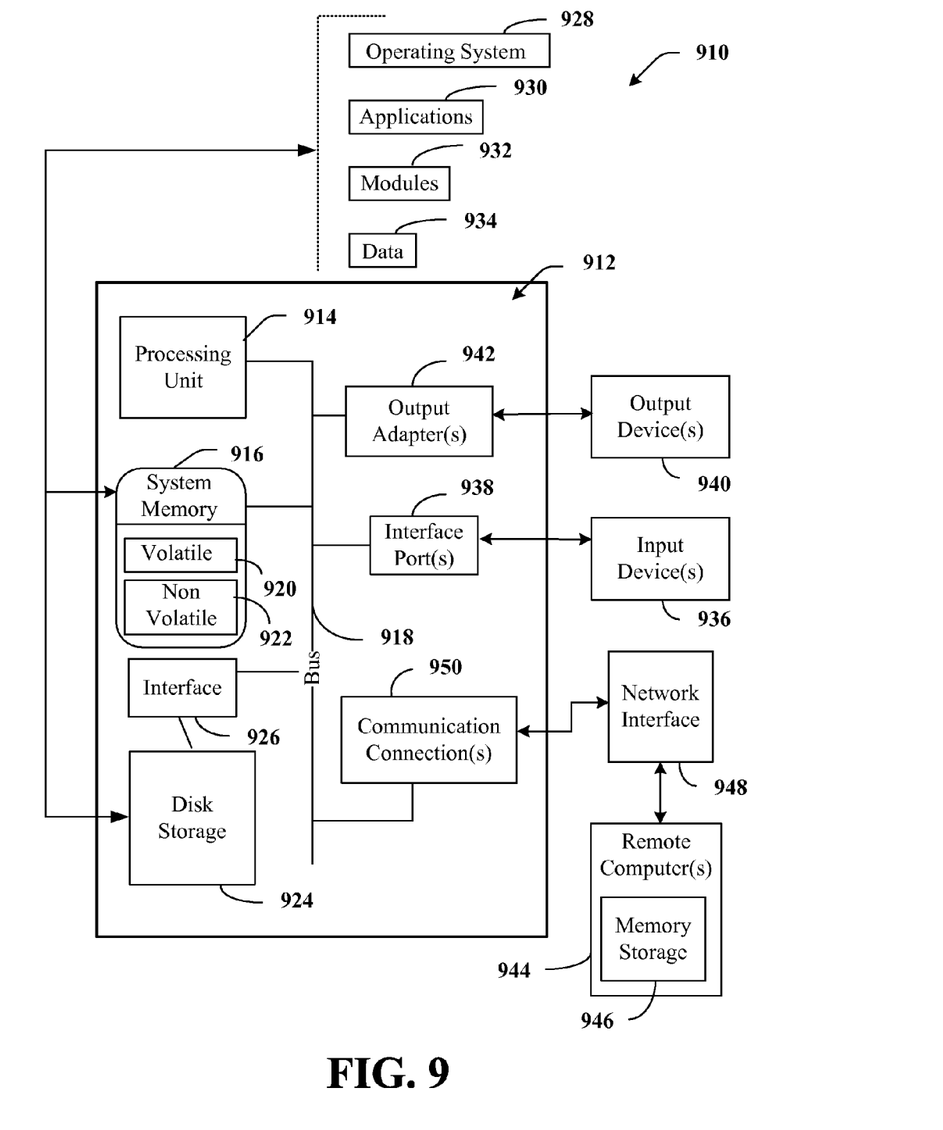
FIG. 9 illustrates an example development system computing environment.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
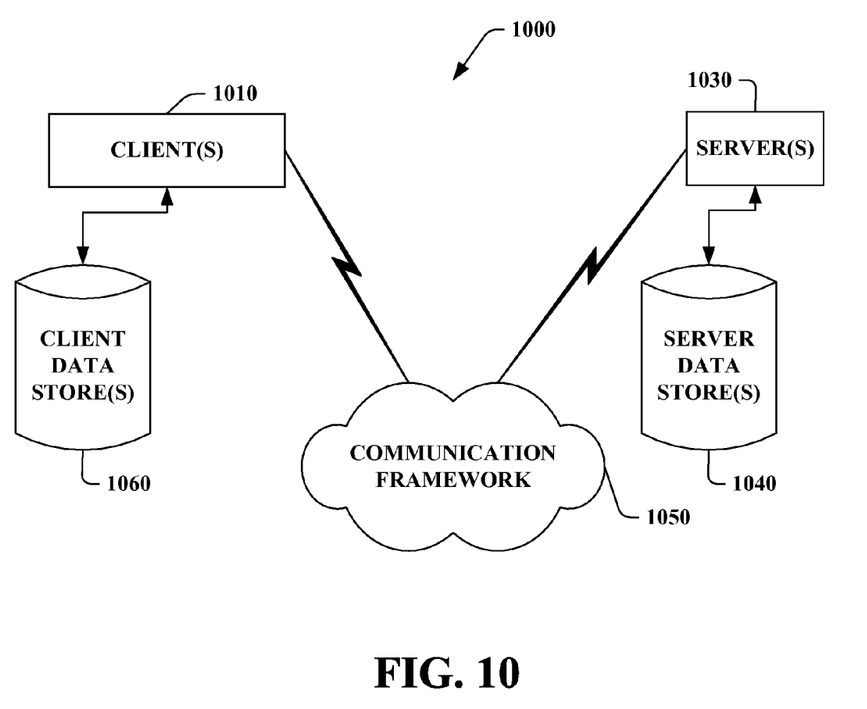
FIG. 10 illustrates an example client and server system for executing a editing and documentation process.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A software documentation system, comprising:
    at least one processor that executes the following computer executable components stored on at least one non-transitory computer readable medium:
        a selection component that detects a project component within a context of a current language, the detected project component includes at least one documentation object associated with a software development tool in the software documentation system;
        a translation viewer provides an automated interface that displays alternative language documentation associated with the detected project component during editing of the at least one documentation object associated with the detected project component in the current language, when the alternative language documentation corresponding to the at least one documentation object exists in a storage medium operatively coupled to the software development tool; and
        an editor associated with the translation viewer that is linked to the context of the current language, the editor enables modification of the at least one documentation object associated with the detected project component,
        wherein the translation viewer provides an alert that is indicative of an existence of the alternative language documentation and provides a reminder that the alternative language documentation is to be adjusted in view of changes made to the at least one documentation object via the editor.

2. The system of claim 1, wherein the automated interface appears dynamically near or above the editor and unobtrusively depicts the alternative language documentation in a faint form.

3. The system of claim 1, further comprising a component to switch from a current language to an alternative language.

4. The system of claim 1, the selection component is linked to a component that triggers activation of the translation viewer.

5. The system of claim 1, the selection component causes the project component to trigger a display of alternative language documentation.

6. The system of claim 5, the selection component triggers a change from an alpha-blended display to an opaque display of alternative language documentation.

7. The system of claim 1, wherein the at least one documentation object includes one or more comments associated with at least one of a program object, program instruction, specification, design guidelines algorithm, visual object, sound objects ladder logic element, Sequential Function Chart element, Function Block Diagram, or a high level programming language object.

8. The system of claim 1, the editor is associated with ladder logic, Sequential Function Chart element, Function Block Diagram, tag editors, properties editors, or structured text editors.

9. The system of claim 1, further comprising an import and export utility to facilitate creation of the alternative language documentation based on one or more comments, in a first language, assigned to the project component.

10. The system of claim 1, further comprising an automatic language translator to facilitate creation of the alternative language documentation from one or more comments, in a first language, supplied to the project component.

11. The system of claim 1, the translation viewer includes a language selection box that enables selection of alternative languages.

12. The system of claim 11, the translation viewer includes a paste function that enables copying of the alternative language documentation into an edit control window of an editor that is employed to modify the documentation in the current language.

13. The system of claim 11, the translation viewer is associated with a help function to provide operating instructions to a user.

14. The system of claim 11, further comprising at least one configuration menu to adjust display characteristics of the translation viewer.

15. The system of claim 14, further comprising a configuration switch to disable or enable the translation viewer.

16. The system of claim 15, wherein the configuration menu provides at least one of display adjustments, display justifications, grid adjustments, drag adjustments, fading options, font adjustments, or color adjustments associated with the translation viewer.

17. The system of claim 15, the configuration menu is applied to at least one of an application editor, a tag editor, a ladder editor, a sequential function chart editor, a function block editor, or a structured text editor.

18. The system of claim 1, further comprising a properties component that adjusts how the translation viewer is displayed for different application contexts.

19. The system of claim 1, further comprising a component to detect whether an alternative language associated with the project component is available.

20. A method for multi-lingual project documentation and editing comprising:
- detecting a project, within a context of a current language, that includes at least one documentation object associated with a software development tool;
- editing at least one documentation object associated with the detected project in the current language; and
- presenting an automated interface that displays alternative language documentation associated with the detected project during editing of the at least one documentation object associated with the detected project in the current language on a user interface, when the alternative language documentation corresponding to the at least one documentation object exists in a storage medium operatively coupled to the software development tool,
- wherein the presenting includes providing an alert that is indicative of an existence of the alternative language documentation and providing a reminder indicating that the alternative language documentation is to be adjusted in view the editing of the documentation.

21. The method of claim 20, further comprising, specifying whether or not the alternative language documentation exists for the at least one documentation object.

22. The method of claim 20, further comprising storing at least one of the at least one documentation object associated with the detected project in the current language or the alternative language documentation.

23. The method of claim 20, further comprising, triggering a change from an alpha-blended display to an opaque display of the alternative language documentation.

24. The method of claim 20, further comprising enabling or disabling a display of the alternative language documentation.

25. The method of claim 20, further comprising switching from the current language to an alternative language.

26. The method of claim 20, further comprising facilitating language translations to generate the alternative language documentation.

27. A method to generate software documentation, comprising:
- associating a current language with an editor associated with a software development tool;
- enabling the editor to modify documentation associated with the current language;
- obtaining a translation of the documentation associated with the current language in an alternative language from a storage medium, when the editor is enabled; and
- displaying, in response to an edit initiated to the documentation associated with the current language, the translation in the alternative language, via an automated interface, near or above an edit window of the editor,
- wherein the displaying includes presenting an alert that is indicative of an existence of the translation in the alternative language and presenting a reminder indicating that the translation in the alternative language is to be modified in view of a modification of the documentation associated with the current language via the editor.

28. The method of claim 27, further comprising generating translations in one or more alternative languages for a documentation system.

29. The method of claim 28, further comprising switching between the one or more alternative languages.

30. The method of claim 27, further comprising switching between a faint display of text and a bold display of text upon a pointer hovering over the translation in the alternative language.

31. The method of claim 27, wherein the displaying includes dynamically displaying an automated interface that unobtrusively depicts the translation in the alternative language in a faint form.

32. The method of claim 27, further comprising altering a translation display in view of a documentation context.

33. A development system, comprising:
- means for editing a documentation object in a software development tool according to a current language context by employing an edit window; and
- means for presenting a translation of the documentation object in an alternative language received from a storage medium, near or above the edit window, in response to an initiation of modification of the documentation object in a current language by the means for editing,
- wherein the means for presenting provides an alert indicative of an existence of the translation of the documentation object and provides a reminder indicating that the translation of the documentation object is to be updated in view of a change made to the documentation object via the means for editing.

34. The development system of claim 33, further comprising means for switching between a current language context and an alternative language context.

* * * * *